Oct. 27, 1959 S. P. PROSEN ET AL 2,910,251
PLASTICS WINDING MACHINE
Filed May 15, 1958 2 Sheets-Sheet 1

INVENTORS,
S. P. PROSEN
H. B. McLELLAND, Jr.
BY
ATTYS.

Oct. 27, 1959    S. P. PROSEN ET AL    2,910,251
PLASTICS WINDING MACHINE
Filed May 15, 1958    2 Sheets-Sheet 2

INVENTORS.
S. P. PROSEN
H. B. McLELLAND, Jr.
BY
ATTYS.

United States Patent Office 2,910,251
Patented Oct. 27, 1959

2,910,251

PLASTICS WINDING MACHINE

Stanley P. Prosen, Lanham, and Howard B. McLelland, Jr., Rockville, Md., assignors to the United States of America as represented by the Secretary of the Navy Application May 15, 1958, Serial No. 735,652

2 Claims. (Cl. 242—43)

(Granted under Title 35, U.S. Code (1952), sec. 266)

The invention described herein may be manufactured and used by or for the Government of the United States of America for governmental purposes without the payment of any royalties thereon or therefor.

This invention relates generally to a machine for winding reinforced plastics structures and is more particularly concerned with a new and novel winding machine utilizing two tandem variable speed transmissions.

Tubular articles such as corrosion resistant conduits and casings are frequently fabricated by winding a series of reinforcing glass threads, strands, or strips of cloth from a feed mechanism onto a formed mandrel as the feed mechanism reciprocates along a line parallel to the axis of the mandrel and simultaneously therewith depositing a quantity of resin on the mandrel. Rotation of the mandrel is discontinued then the resultant glass reinforced resin structure is removed from the mandrel as a unitary structure.

At times it becomes desirable, for various reasons, to alter the wall thickness of the structure, or the pitch of wind of the reinforcing fibers by changing the relative speed of rotation of the mandrel and the speed of reciprocation of the reinforcing yarn feed mechanism.

In addition, in winding ogival structures it is necessary to vary the relative speed of rotation of the mandrel with respect to the reciprocating speed of the yarn feed mechanism in order to prevent slipping of the yarn on the mandrel.

Prior to this invention, it has been the practice in this art to utilize a gear train system to govern the relative speed of the mandrel and the rate of travel of the feed mechanism. This system is relatively inflexible and requires a change of gears whenever it is necessary to alter the angle of wind. Furthermore, continuous operation is impossible if several different angles of wind are required in one piece when the old system is employed.

Accordingly, it is an object of this invention to provide a tube winder requiring no mechanical system changes to alter angles of wind of the reinforcing fibers.

Another object is the provision of a new and improved plastics winding machine capable of operation at almost any angle of wind and capable of operation at continuously changing angles along the axis of the structure being formed.

Still another object is the provision of a new and improved plastics winding machine including a functionally integrated indexing device to promote proper laydown of successive layers of the winding material.

These and many other objects will become more readily apparent when the following description is read in conjunction with the accompanying drawings wherein like numerals designate like or similar parts throughout the various views and in which.

Figure 1:
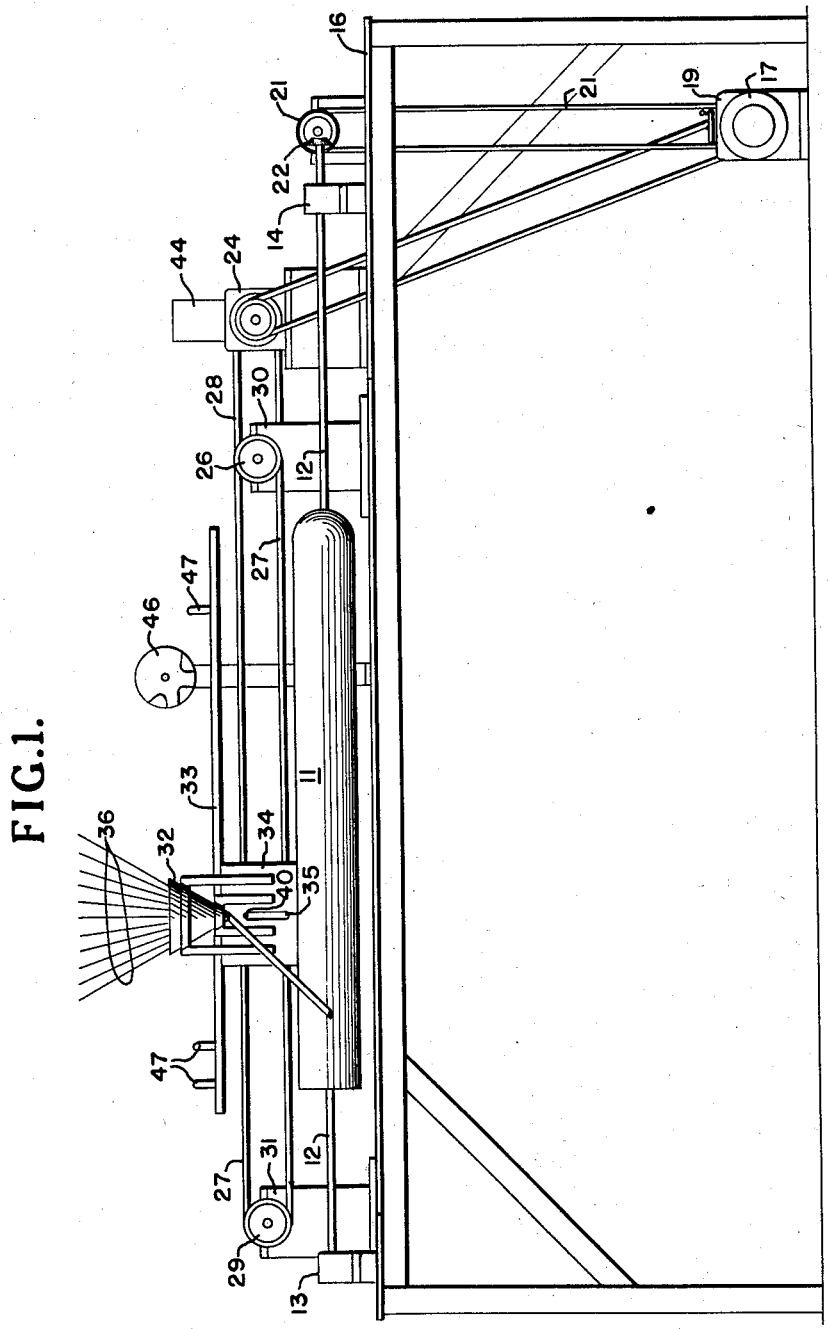
Fig. 1 is an elevational view of a preferred embodiment of the invention.
Figure 2:
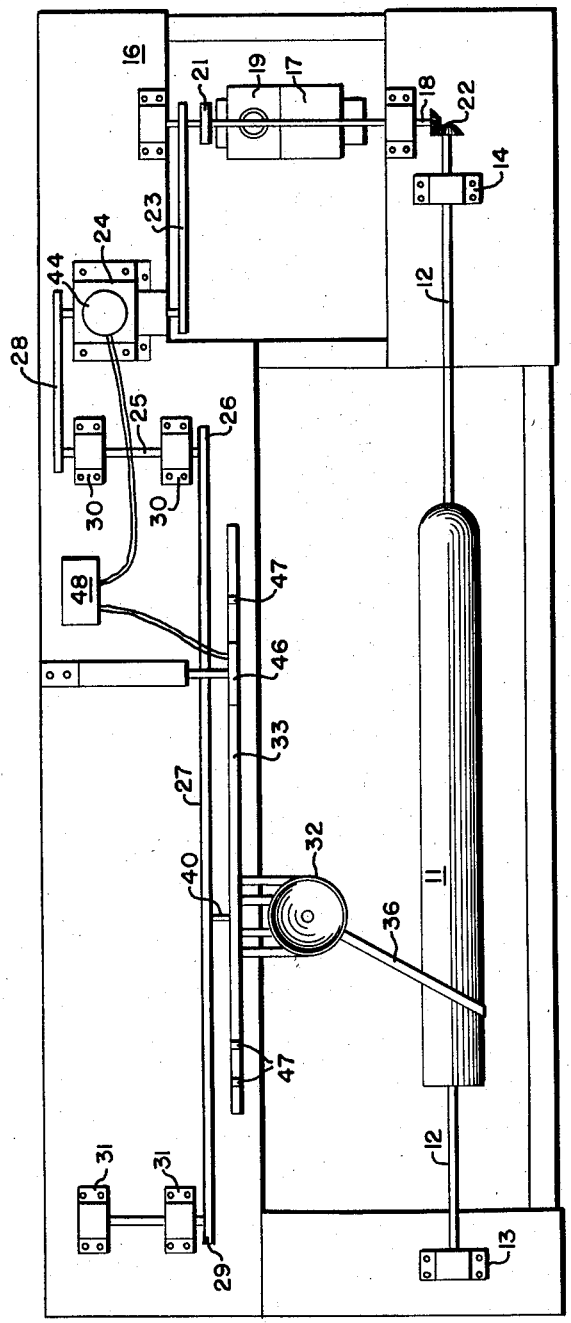
Fig. 2 is a plan view of the apparatus of Fig. 1.

Briefly, this invention is directed to a tube winder which is operated by two tandem variable speed transmissions and an electric motor. The first transmission is driven by the motor and governs the overall speed of operation of the device. It activates two movements, that of turning the mandrel and that of driving the second transmission. The second transmission actuates a yarn guide which reciprocates along the length of the tube being wound. The second transmission output speed is controlled in several ways; it can be set at one speed for constant angles of wind or it can be activated by a cam mechanism to change the speed of the guide continuously. It can also be activated so that indexing of the winding is accomplished for momentary changes in the carriage or output speed.

Referring now with greater particularly to the drawings, it is seen that the mandrel 11 is fixed to rod 12 which is rotatably disposed in journals 13 and 14 near its ends. A table 16 serves to support the journals in the greater part of the apparatus.

An electric motor 17 may conveniently be secured to the floor under table 16 to drive shaft 18 through the variable speed transmission 19 and a belt and pulley arrangement indicated at 21. The shaft 18 is geared to rod 12 at 22 to complete the drive from motor 17 to the mandrel 11.

A second belt and pulley arrangement 23 connects the shaft 18 with the input of a second variable speed transmission 24 having its output connected to a drive gear 26 associated with an endless chain 27, by any suitable arrangement such as a belt and pulley shown at 28 and shaft 25. Drive gear 26 and idler gear 29 are rotatably supported by journals 30, 31, respectively so that endless chain 27 operates slightly above and in the direction parallel to the mandrel 11.

A yarn guide and resin receptacle 32 is secured to a follower rod 33 operatively connected to the chain 27 for movement therewith by a carriage or bracket 34. Guide 32 is formed to retain a quantity of resin so that threads 36 are completely impregnated with resin as they move through the guide. The carriage 34 has formed therein a vertical slot 35 to receive a pin 40 fixed to the chain 27 thereby providing the drive connection between the chain and the yarn guide 32. It is not necessary to reverse the drive to the chain at the end of the travel of the guide 32 because pin 40 is free to slide in slot 35 as it moves around gear 26 and idler gear 29 to automatically reverse the movement of the yarn guide 32 each time pin 40 passes around one of these gears.

Mounted upon transmission 24 is a servo motor 44 for varying the input-output speed ratio of the transmission 24. Servo motor 44 may be adjusted manually or may be actuated by a multiposition switch such as that shown as a dial 46. The dial is sequentially tripped by a number of cams or fingers 47 fixed to rod 33. Each time the dial is tripped it signals a servo amplifier mechanism 48 which in turn actuates servo motor 44 to vary the output speed of transmission 24. Any suitable servo system may be used to alter the speed of the transmission 24, in actual practice a dial-trol servo mechanism and a shaftrol servo motor and an ordinary multiposition electric switch were found to be entirely suitable.

In the event that it is desirable to increase the thickness of the finished piece at its ends, the servo motor 44 will be operated at either end of the travel of the yarn guide to decrease the speed ratio of transmission 24 and slow down the yarn guide near the end of its travel by tripping switch 46 with appropriate cams 47.

Since the input to transmission 24 is connected to the output of transmission 19, any accidental change in the speed of motor 17 which alters the speed of rotation of mandrel 11 will have a proportional effect on the speed of travel of the yarn guide 32 thereby maintaining constant thickness of the piece and angle of laydown even though the speed of rotation of the mandrel varies. Furthermore, by using the combination of these two transmissions, it is possible to achieve completely automatic operation of the laydown apparatus.

Although this invention has been described with reference to but one particular embodiment, it is by no means so limited. Accordingly, the scope of this invention is to be determined only by the scope of the appended claims.

What is claimed as new and desired to be secured by Letters Patent of the United States is:

1. Apparatus for winding a tubular plastics structure containing reinforcing fibers comprising; a rotatable mandrel, a yarn guide disposed adjacent to said mandrel and adapted to lay down reinforcing fibers and plastics along said mandrel, drive means, a first variable speed transmission having its input connected to the output of said drive means and having a portion of its output connected to said mandrel for rotation thereof, a second variable speed transmission having its input connected to said output of said first variable speed transmission and its output operatively connected to said yarn guide for reciprocating said yarn guide along said mandrel, control means operatively connected to said yarn guide and including a rod secured to said yarn guide and a plurality of cams fixed to said rod, a multiposition switch sequentially operable to different positions by said cams, a servo motor operatively connected to said second variable speed transmission and operable to alter the output speed thereof, and a servo amplifier mechanism operatively connecting said servo mechanism and said multiposition switch to operate said servo motor to selectively vary the output speed of said second variable speed transmission in response to the instant position of said yarn guide thereby to control the thickness of the finished structure.

2. Apparatus for winding a plastics structure having reinforcing yarns therein comprising: a rotatable mandrel, a yarn guide, a drive gear, an idler gear, an endless chain operatively disposed about said gears, a pin means fixed to said chain, a bracket fixed to said yarn guide and having a slot therein to receive said pin means for reciprocating said yarn guide upon rotation of said drive gear and movement of said chain, an electric motor, a first variable speed transmission having an input connected to the output of said motor, and having a portion of its output connected to said mandrel for rotation thereof, a second variable speed transmission having its input connected to the output of said first variable speed transmission and operatively connected to said drive gear for moving said chain as the mandrel rotates, means for controlling the output speed of said second variable speed transmission including a rod secured to said yarn guide and a plurality of cams fixed to said rod, a multiposition switch sequentially operable to different positions by said cams, a servo motor operatively connected to said second variable speed transmission and operable to alter the output speed thereof, and a servo amplifier mechanism operatively connecting said servo motor to selectively alter the output speed of said second variable speed transmission thereby to control the thickness of the finished structure and the angle of wind of the reinforcing material.

References Cited in the file of this patent

UNITED STATES PATENTS

| | | |
|---|---|---|
| 1,846,767 | Steuer | Feb. 23, 1932 |
| 2,135,072 | Forster | Nov. 1, 1938 |
| 2,435,431 | Fain | Feb. 3, 1948 |
| 2,751,320 | Jacobs | June 19, 1956 |
| 2,757,884 | Bryant | Aug. 7, 1956 |
| 2,798,531 | Jackson | July 9, 1957 |